United States Patent
Wilhelm et al.

(10) Patent No.: US 10,207,835 B2
(45) Date of Patent: Feb. 19, 2019

(54) CAPPING MACHINE IN A BEVERAGE BOTTLING PLANT CONFIGURES TO CAP BEVERAGE BOTTLES WITH BEVERAGE BOTTLE CROWN CAPS OR BEVERAGE BOTTLE SCREW CAPS AND A CAPPING MACHINE CONFIGURED TO CAP CONTAINERS WITH CONTAINER CAPS

(71) Applicants: Lothar Wilhelm, Karben (DE); Heinz Hillmann, Obrigheim (DE)

(72) Inventors: Lothar Wilhelm, Karben (DE); Heinz Hillmann, Obrigheim (DE)

(73) Assignee: KHS GmbH, Dortmund (DE)

( * ) Notice: Subject to any disclaimer, the term of this patent is extended or adjusted under 35 U.S.C. 154(b) by 537 days.

(21) Appl. No.: 14/680,229

(22) Filed: Apr. 7, 2015

(65) Prior Publication Data

US 2016/0009435 A1 Jan. 14, 2016

Related U.S. Application Data

(63) Continuation of application No. 12/372,947, filed on Feb. 18, 2009, which is a continuation-in-part of
(Continued)

(30) Foreign Application Priority Data

Aug. 19, 2006 (DE) ......................... 10 2006 039 091

(51) Int. Cl.
*B65B 57/04* (2006.01)
*B65B 7/28* (2006.01)
(Continued)

(52) U.S. Cl.
CPC ............ *B65B 57/04* (2013.01); *B65B 7/2807* (2013.01); *B65G 47/24* (2013.01); *B65G 47/256* (2013.01);
(Continued)

(58) Field of Classification Search
CPC ..... B65B 7/2807; B65B 57/04; B65G 47/256; B65G 47/24
(Continued)

(56) References Cited

U.S. PATENT DOCUMENTS 2,658,654 A * 11/1953 Schweizer ............ B67B 3/2046
221/310
2,841,940 A 7/1958 Brown
(Continued)

FOREIGN PATENT DOCUMENTS

CN 1100061 A 3/1995
DE 2238898 2/1974
(Continued)

OTHER PUBLICATIONS

International Search Report PCT/EP2007/007206 and English translation thereof.

*Primary Examiner* — Christopher R Harmon
(74) *Attorney, Agent, or Firm* — Nils H. Ljungman & Associates (57) ABSTRACT

A capping machine in a beverage bottling plant configured to cap beverage bottles with beverage bottle crown caps or beverage bottle screw caps and a capping machine configured to cap containers with container caps. The abstract of the disclosure is submitted herewith as required by 37 C.F.R. § 1.72(b). As stated in 37 C.F.R. § 1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the
(Continued)

abstract are not intended to limit the claims in any manner and should not be interpreted as limiting the claims in any manner.

11 Claims, 8 Drawing Sheets

Related U.S. Application Data application No. PCT/EP2007/007206, filed on Aug. 16, 2007.

(51) Int. Cl.
*B65G 47/256* (2006.01)
*B65G 47/24* (2006.01)

(52) U.S. Cl.
CPC .. *B65G 2203/042* (2013.01); *B65G 2203/044* (2013.01)

(58) Field of Classification Search
USPC ........ 53/68, 476, 484–485, 490, 266.1, 281, 53/284.5, 284.6, 317, 324, 52, 505, 506, 53/64; 493/3, 12–18
See application file for complete search history.

(56) References Cited

U.S. PATENT DOCUMENTS

| | | | |
|---|---|---|---|
| 3,015,388 A | | 1/1962 | Wilckens |
| 3,532,202 A | * | 10/1970 | Ochs ................. B65G 47/1421 193/48 |
| 3,603,441 A | * | 9/1971 | Ansell ................. B65G 47/256 193/46 |
| 3,650,369 A | | 3/1972 | Vergobbi |
| 3,789,983 A | | 2/1974 | Senesky |
| 3,828,921 A | * | 8/1974 | Tackett, Jr. .......... B65G 47/256 198/396 |
| 3,872,651 A | | 3/1975 | Leonard |
| 3,879,921 A | | 4/1975 | Leonard |
| 3,905,317 A | | 9/1975 | Pacilio |
| 3,970,218 A | * | 7/1976 | Lee ...................... B65G 47/256 198/396 |
| 4,006,812 A | | 2/1977 | Everett et al. |
| 4,040,236 A | | 8/1977 | Siler et al. |
| 4,111,295 A | * | 9/1978 | Rutherford .......... B65G 47/256 198/399 |
| 4,209,899 A | * | 7/1980 | Dragotta ............... B23P 19/004 29/783 |
| 4,277,928 A | | 7/1981 | Ahlers |
| 4,312,172 A | * | 1/1982 | Fisher ....................... B65B 7/28 221/14 |
| 4,349,998 A | | 9/1982 | Covert |
| 4,735,343 A | * | 4/1988 | Herzog ................. B65G 47/256 198/393 |
| 4,773,204 A | * | 9/1988 | Rydstrom ................ B67B 3/26 53/313 |
| 4,872,300 A | | 10/1989 | Luke |
| 4,884,678 A | | 12/1989 | Graham et al. |
| 4,885,894 A | * | 12/1989 | Herzog ................... B67B 3/062 53/314 |
| 4,995,503 A | | 2/1991 | Graham et al. |
| 5,050,367 A | * | 9/1991 | Heisler ................. B65B 7/2807 53/313 |
| 5,117,963 A | | 6/1992 | Thayer et al. |
| 5,159,797 A | * | 11/1992 | Herzog ................... B67B 3/064 193/47 |
| 5,309,694 A | * | 5/1994 | Bernhard ........... B65G 47/1457 53/314 |
| 5,348,133 A | | 9/1994 | Powell et al. |
| 5,438,814 A | | 8/1995 | Lovett et al. |
| 5,617,710 A | | 4/1997 | Goossens et al. |
| 5,775,478 A | * | 7/1998 | Shinjo .................. B65G 47/256 193/25 FT |
| 5,954,185 A | | 9/1999 | Eshelman et al. |
| 6,062,395 A | | 5/2000 | Oravetz et al. |
| 6,325,200 B1 | | 12/2001 | Poppi |
| 6,523,330 B1 | | 2/2003 | Hurd |
| 6,540,062 B2 | | 4/2003 | Wunscher et al. |
| 7,669,707 B2 | | 3/2010 | Kenneway |
| 2005/0241914 A1 | * | 11/2005 | Schoenke .......... B65G 21/2018 198/443 |

FOREIGN PATENT DOCUMENTS

| | | |
|---|---|---|
| DE | 44 06 511 | 9/1994 |
| DE | 696 24 779 | 7/2003 |
| DE | 103 07 601 | 12/2003 |
| EP | 0 782 888 | 7/1997 |
| IT | 2004139695 | 7/2004 |
| JP | 56123224 | 9/1981 |
| JP | H0228412 | 1/1990 |
| JP | 6087510 | 3/1994 |
| JP | 7101494 | 4/1995 |
| JP | 2000292255 | 10/2000 |
| JP | 2001018907 | 1/2001 |
| JP | 2005126162 | 5/2005 |
| JP | 2005343521 | 12/2005 |
| JP | 2008028412 | 2/2008 |
| SU | 776968 | 11/1980 |
| SU | 1676934 | 9/1991 |
| WO | WO03047773 | 6/2003 |

* cited by examiner

CAPPING MACHINE IN A BEVERAGE BOTTLING PLANT CONFIGURES TO CAP BEVERAGE BOTTLES WITH BEVERAGE BOTTLE CROWN CAPS OR BEVERAGE BOTTLE SCREW CAPS AND A CAPPING MACHINE CONFIGURED TO CAP CONTAINERS WITH CONTAINER CAPS

CONTINUING APPLICATION DATA

This application is a Continuation-In-Part application of International Patent Application No. PCT/EP2007/007206, filed on Aug. 16, 2007, which claims priority from Federal Republic of Germany Patent Application No. 10 2006 039 091.1, filed on Aug. 19, 2006. International Patent Application No. PCT/EP2007/007206 was pending as of the filing date of this application. The United States was an elected state in International Patent Application No. PCT/EP2007/007206.

BACKGROUND

1. Technical Field

The present application relates to a capping machine in a beverage bottling plant configured to cap beverage bottles with beverage bottle crown caps or beverage bottle screw caps and a capping machine configured to cap containers with container caps.

2. Background Information

Background information is for informational purposes only and does not necessarily admit that subsequently mentioned information and publications are prior art.

Devices for the feeding of cap-type closures, including cap-type closures that are realized in the form of screw caps, to capping machines or to the cap transport mechanisms of such capping machines for the capping of bottles or similar containers are known in a wide variety of realizations. Basically, devices of this type comprise a feed or conveyor channel, the cross section of which is adapted to the shape of the closures, i.e. it can be realized in a rectangular shape, for example, so that the closures are oriented in the conveyor channel with their closure axis perpendicular or substantially perpendicular to the direction of conveyance and can thereby be in one of two orientations, and for example one orientation which is correct for the processing of the closures in which the cap-type closures are oriented with their open side facing a first side of the conveyor channel, and an incorrect orientation which is not usable for the further processing, in which the cap-type closures are oriented with their open side facing a second side of the conveyor channel which is opposite the first side.

The closures reach the conveyor channel after traveling through a sorting unit. In this sorting unit, the closures are oriented so that almost all of the closures that are transferred to the conveyor channel are already in the correct orientation. Nevertheless, it is inevitable that a very small number of closures will get into the conveyor channel in the incorrect orientation.

To prevent, restrict, and/or minimize errors in the closing or capping of the containers, on some devices a blocking device is provided on the respective conveyor channel, in the form of a star wheel, for example, which allows correctly oriented closures to pass but blocks the conveyor channel for incorrectly oriented closures, although it also blocks the conveyor channel for all or substantially all or most of the subsequent closures, which inevitably results in a production shutdown. The incorrectly oriented closures must or should then be removed manually from the conveyor channel. This procedure requires or desires manual activity and is relatively time consuming, which is undesirable in industrial operations.

OBJECT OR OBJECTS

An object of the present application is to describe a device for the feeding of cap-type closures, and thereby of screw cap closures in one possible embodiment, to a capping machine which overcomes the disadvantages described above. The present application teaches that this object is accomplished by the apparatus for the feeding of cap-type closures, in particular screw caps to a capping machine, with at least one conveyor channel which has a cross section that matches the shape of the caps so that the caps are oriented in this conveyor channel with their cap axis perpendicular or substantially perpendicular to the direction of transport in an orientation imposed by the cross section of the conveyor channel. The apparatus also comprises means for the discharge or ejection from the conveyor channel of caps that are not in the necessary or desired orientation for their further processing. On the conveyor channel, there is at least one sensor which detects the orientation of the caps, and downstream of said sensor in the direction of transport, there is a discharge or ejector station which is activated by an electronic control device as a function of the sensor signal from the at least one sensor for a discharge or ejection of an incorrectly oriented cap.

SUMMARY

The present application relates to an apparatus for the feeding of caps to a capping machine.

This present application relates to an apparatus for the feeding of cap-type closures, in one possible embodiment screw caps, to a capping machine, with at least one conveyor channel which has a cross section that matches the shape of the caps so that the caps are oriented in this conveyor channel with their cap axis perpendicular or substantially perpendicular to the direction of transport in an orientation imposed by the cross section of the conveyor channel. The apparatus also comprises means for the discharge or ejection from the conveyor channel of caps that are not in the necessary or desired orientation for their further processing.

On the apparatus according to the present application, on which the cross section of the conveyor channel is in one possible embodiment designed so that the closures in this channel can be in one of two possible orientations with reference to their closure axis, the closures are monitored as they pass at least one main sensor that is provided on the conveyor channel and interacts with an electronic control device (e.g. a computer). Incorrectly oriented closures are ejected or discharged from the conveyor channel in a controlled manner by the electronic control device to a discharge or ejector station.

With the at least one main sensor, the open side or the closed side of the cap-type closures is monitored as a criterion for the correct orientation of the cap-type closures. To achieve the highest possible or optimum reliability, the at least one main sensor and/or the associated control device are realized, for example, so that whenever a correctly oriented closure passes the main sensor, it sends a confirmation to the control device by means of a corresponding control signal, and on the basis of this confirmation, the control device does not activate the discharge or ejection station, while if this confirmation is not received, the outward transfer or ejection station is activated.

In one possible embodiment of the present application, a fast and simple discharge or ejection of incorrectly oriented closures is possible, so that the capping machine does not need to be shut down or a shut down is not desired, and production does not need to be interrupted or interruption is not desired.

In one possible embodiment of the present application, up to 70,000 bottles per hour are to be capped, which means that the feeder systems must be able or should be able to handle this number of units. It should be noted that generally, no redundant equipment is provided.

In one possible embodiment of the present application with a direct electrical or opto-electrical detection, the speed of the caps in the conveyor flow is increased further. Greater numbers of items can be transported without any or many disruptions.

In at least one possible embodiment of the present application, the cap-type closures are crown caps or screw caps for beverage bottles or for other containers.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Developments of the present application are described below. The present application is explained in greater detail below with reference to one possible embodiment which is illustrated in the accompanying drawings, in which.

DESCRIPTION OF EMBODIMENT OR EMBODIMENTS

The apparatus which is designated 1 in general in the figures is used for the feeding of cap-type screw caps 2 made of metal and/or plastic to a capping machine (screw capper), which is not shown, for the installation of the screw caps 2 on bottles or similar containers, which are also not shown, by screwing them on.

In at least another possible embodiment of the present application, the cap-type closures 2 may be crown caps 2. Other types of closures 2 are also possible for use with the cap feeder 1 of the present application.

The apparatus 1 essentially comprises a sorting unit 3 which receives screw caps 2 in an unorganized quantity from a supply, whereby the sorting unit 3 can be realized, for example, in the form of a bowl-type vibratory feeder 4 which forms a helical feed path 5 for the screw caps 2 on the interior of a vibrating bowl 4 with baffles or alternatively as a rotating drum 4, so that the screw caps are delivered sorted and with their open side 2.1 in a specified orientation into a conveyor channel 3, the interior cross section of which matches that of the screw caps 2 so that the screw caps are oriented with their closure VA perpendicular or virtually perpendicular to the longitudinal dimension of the conveyor channel 6 and with respect to the direction of transport A, and form a single-file row in this conveyor channel 6. The conveyor channel, which can have a rectangular interior cross section, for example, extends from the sorting unit 3 downward in the vertical direction and extends with its lower end 6.1 to the capper or to a closure transfer mechanism which is located at the capper, with which the screw caps 2 are placed on the containers (e.g. bottles) to be closed.

Figure 1:
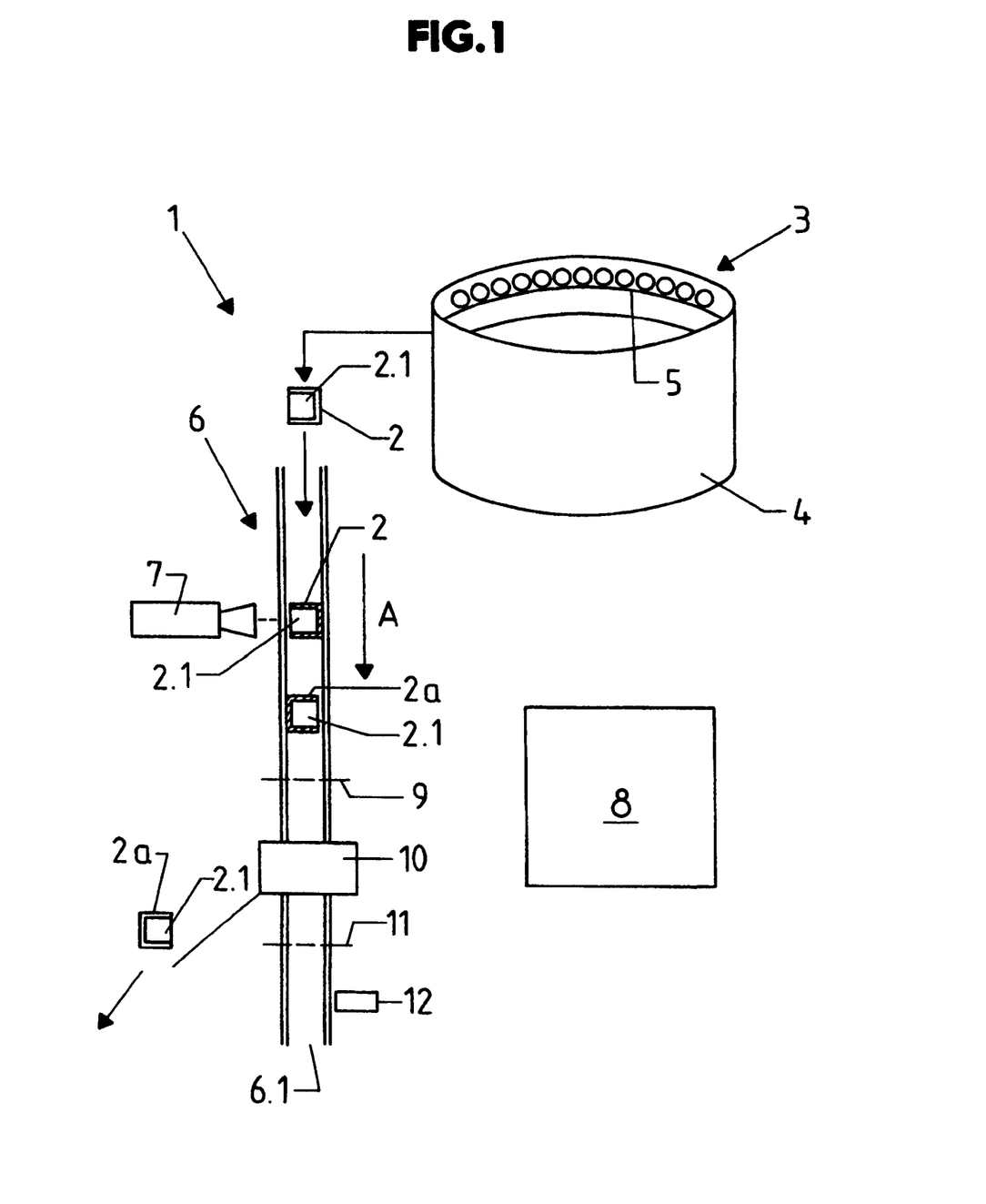
FIG. 1 is a very schematic illustration of the device for the feeding of screw caps to a capping machine (screw capper)

In the possible embodiment illustrated in FIG. 1, the sorting unit 3 and the conveyor channel 6 are realized so that the screw caps 2 which are correctly oriented or in the predetermined orientation for the subsequent capping are oriented with their open side 2.1 oriented to the left in the position illustrated in FIG. 1.

In one possible embodiment of the present application, even at high rates of production of up to 70,000 screw caps 2 processed per hour, it is inevitable that a few isolated screw caps 2a will reach the conveyor channel 6 in an incorrect orientation, whereby these incorrectly oriented closures or closures not in the predetermined orientation, on account of the rectangular interior cross section of the conveyor channel 6, are then oriented with the open side oriented toward the right in the illustration in FIG. 1, as shown for the cap 2a.

Although the error rate in terms of incorrectly oriented screw caps 2a is very low even when the capping machine is operated for a relatively long period, i.e. at a production rate of 70,000 screw caps per hour and an operating cycle of eight hours, the error rate is on the order of 0.5 and 16 incorrectly oriented screw caps 2a, these screw caps 2a cause disruptions in the capping of the containers, which has a negative effect on the total output of the plant. It may therefore be necessary or desired to remove or eject incorrectly oriented screw caps 2a from the conveyor channel 6 before they reach the capping machine.

This removal takes place fully automatically during the feeding of the screw caps 1. For this purpose, on the conveyor channel 6, downstream of the sorting device 3 in the direction of transport A, a main sensor is provided which monitors the screw caps 2 that are moving past this sensor with reference to their orientation, for example so that this sensor 7 detects the open side of these caps 2.1 on correctly oriented screw caps 2 and interacts with an electronic control device 8.

Located on the conveyor channel 6, for example, downstream of the sensor 7 in the direction of transport A, there is a first blocking device 9 with which the stream of screw caps 2 which is continuously or substantially continuously flowing from the sorting unit 3 into the conveyor channel and flowing downward in the conveyor channel 6 is blocked or can be interrupted by a control signal from the electronic control device 8, for example for the discharge or ejection of an incorrectly oriented screw cap 2a.

Downstream of the blocking device 9 in the direction of transport A, there is a discharge or ejector station 10 which is actuated by the control device 8 for the ejection of incorrectly oriented screw caps 2a. The ejected screw caps 2a are collected in a collector, for example, and returned to the sorting unit 3.

Downstream of the ejector station 10 in the direction of transport A, there is a second blocking device 11 which is in one possible embodiment realized so that it allows or permits the correctly oriented screw caps 2 to pass but blocks the conveyor channel 6 to prevent, restrict, and/or minimize the passage of any remaining screw caps 2a that may be incorrectly oriented, so that such incorrectly oriented screw caps 2a can then be removed manually before the caps not in the predetermined orientation reach the capping machine.

Downstream of the blocking device 11 in the direction of transport A is an additional sensor 12 which monitors the presence of screw caps 2 in the conveyor channel 6 via the electronic control device 8, for example, and causes the generation of an error signal, e.g. of an optical and/or acoustical error signal if there are no screw caps 2 in the conveyor channel 6 in the vicinity of the sensor 12. This can be the case if, among other things, the blocking device 11 holds back an incorrectly oriented cap 2a and thus also holds up the flow of the screw caps 2 that are behind it in the conveyor channel 6.

The sensor 7 can be, for example, a mechanical sensor which scans the screw caps 2 as they move past it, and/or an opto-electronic sensor such as a photoelectric barrier, for example, or a camera system of an image processing system that has at least one camera, in which the image taken of the individual screw cap 2 that is moving past the sensor 7 is compared with a reference image. In each case, when the screw cap 2 is in the correct orientation, the sensor 7 sends a corresponding signal to the electronic control unit 8 (e.g. a computer) which prevents, restricts, and/or minimizes an ejection of the screw cap at the ejector station 10. If the screw caps 2a are incorrectly oriented, the sensor 7 sends a signal to the control device 8 which effects the ejection of these screw caps. To determine the correct position of each screw cap 2 and thereby in one possible embodiment also the position of the incorrectly oriented screw caps 2a in the conveyor channel 6 and to eject the incorrectly oriented screw caps 2a with a high degree of reliability, each screw cap 2 or 2a is detected as it passes the sensor 7 for example by this sensor or an additional sensor located there and by a sensor 13 of the discharge or ejector station 10.

Figure 1A:
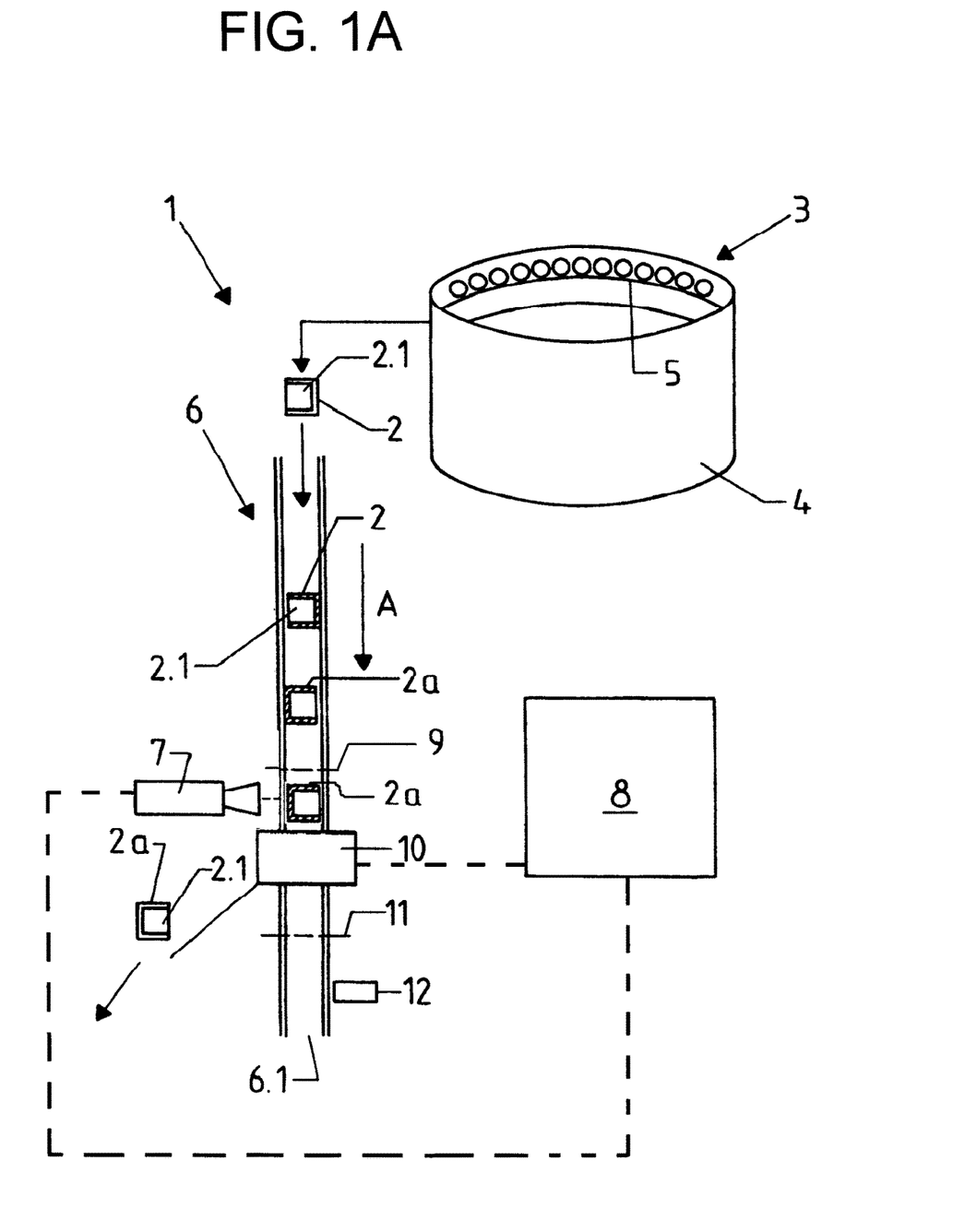
FIG. 1A shows another possible embodiment of the device of the present application for the feeding of correctly oriented caps to a capping machine.

FIG. 1A shows another possible embodiment of the present application. The sensor 7 is immediately upstream or generally before the ejector station 10 in the direction of transport A. The sensor 7 detects the orientation of the caps 2, 2a passing by. When an incorrectly oriented cap 2a passes by the sensor 7, the sensor 7 sends a signal to the control unit or control device 8. The control unit 8 then sends a signal to the ejector station 10 to eject the incorrectly oriented cap 2a.

In another possible embodiment, the sensor 7 sends a signal to the control unit 8 when a correctly oriented cap 2 passes by the sensor 7 on the conveyor channel 6. When an incorrectly oriented cap 2a passes by the sensor 7, the sensor 7 does not send a signal to the control device 8. The control device 8 then sends a signal to the ejector station 10 to eject the incorrectly oriented cap 2a.

Figure 1B:
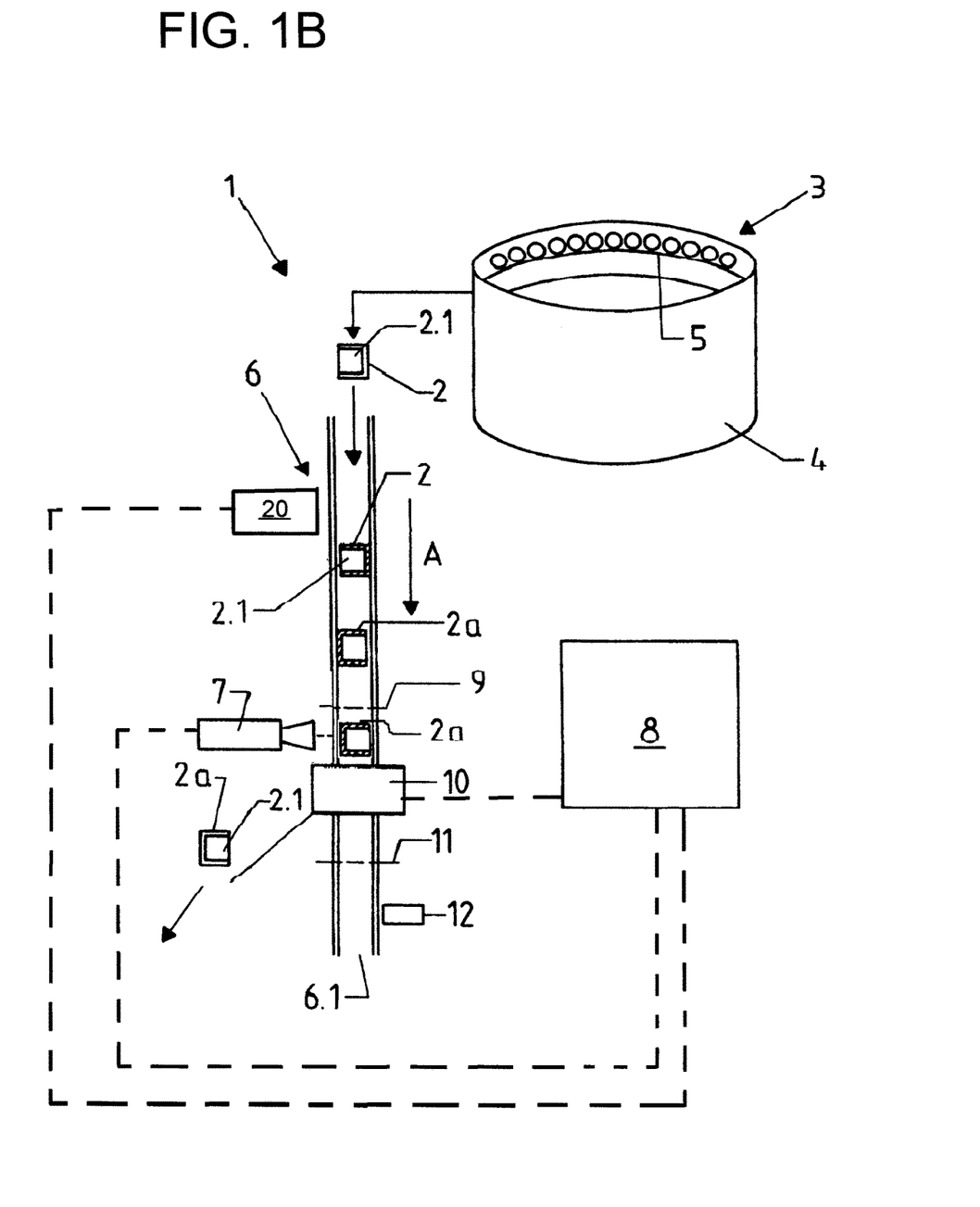
FIG. 1B shows another possible embodiment of the device of the present application with a counter.

FIG. 1B is another illustration of a similar embodiment to that seen in FIG. 1A. In this embodiment of FIG. 1B, a counter 20 is disposed on the conveyor channel above the sensor 7. The counter 20 counts the number of caps 2, 2a that pass by and then sends a signal to the control device 8 with the number of caps 2, 2a passing by. The sensor 7 detects the orientation of the caps 2, 2a passing by. When an incorrectly oriented cap 2a passes by the sensor 7, the sensor 7 sends a signal to the control unit or control device 8. The control unit 8 then sends a signal to the ejector station 10 to eject the incorrectly oriented cap 2a. In a similar embodiment, the sensor 7 also acts as a counter.

Figure 1C:
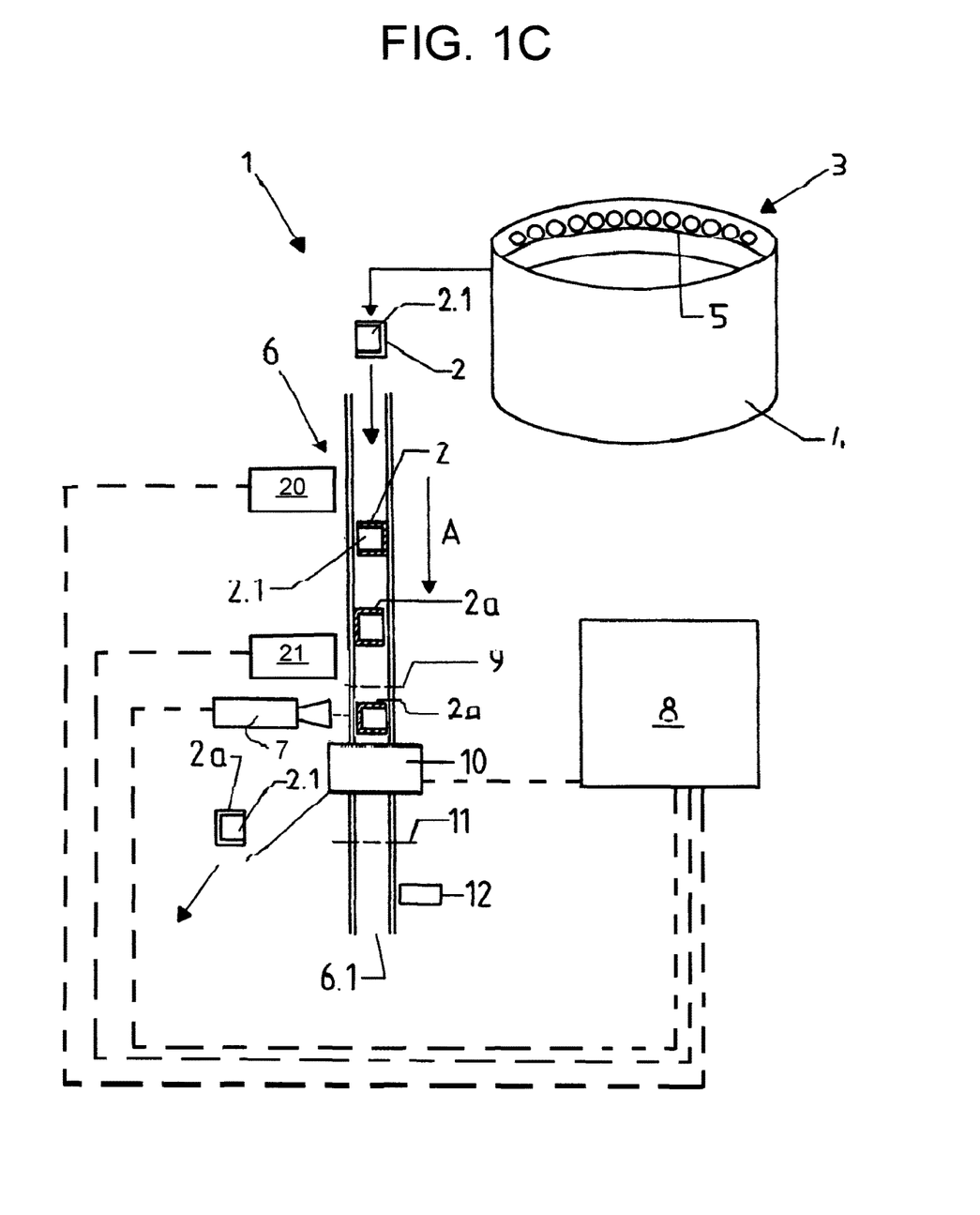
FIG. 1C shows another possible embodiment of the device of the present application in addition with counters.

FIG. 1C shows another embodiment of the present application. In this embodiment, the device comprises two counters 20 and 21. The first counter 20, disposed further from the sensor 7 than the second counter 21, counts the number of caps 2, 2a that pass by and then sends a signal to the control device 8 with the number of caps 2, 2a passing by. The second sensor 21, which is disposed immediately upstream or generally before the ejector station 10 in the direction of transport A, also counts the number of caps 2, 2a passing by and then sends a signal to the control device 8. The control unit 8 can then compute the number of caps 2, 2a passing by and thereby also the rate at which the caps 2, 2a are moving. Then, when the sensor 7 detects an incorrectly oriented cap 2a and sends a signal to the control device 8, the control device 8 sends a signal to the ejector device or station 10 as that incorrectly oriented cap 2a is about to pass through the ejector station 10. The ejector station 10 activates and the incorrectly oriented cap 2a is ejected from the conveyor channel 6.

Figure 2:
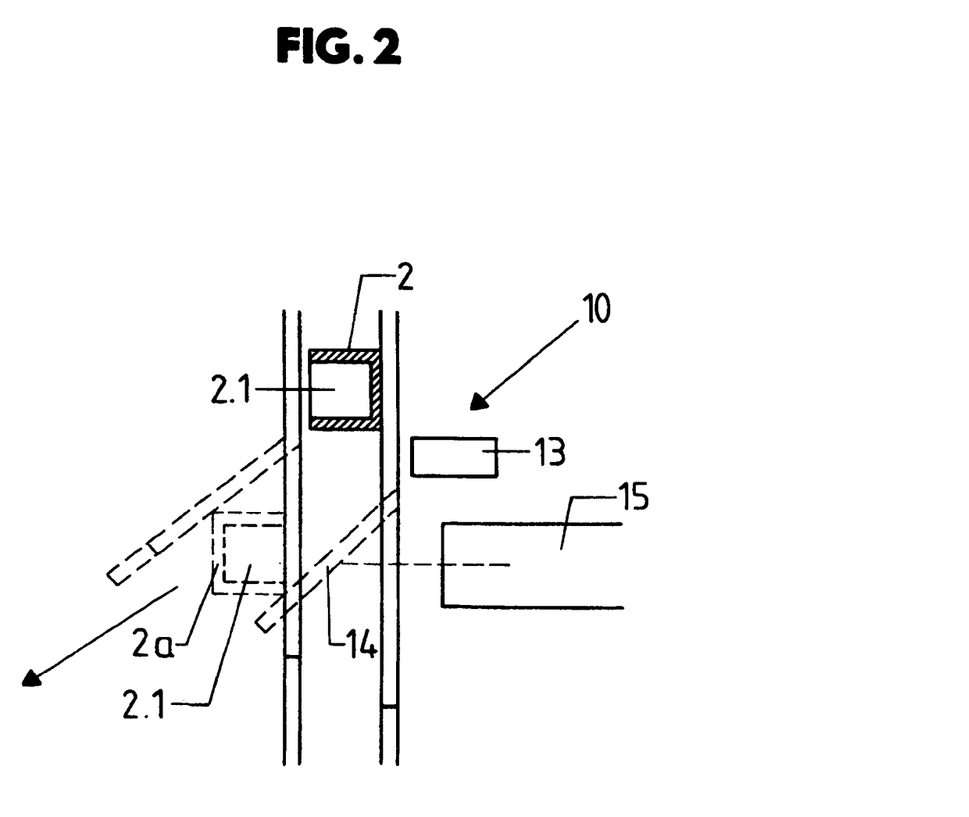
FIG. 2 is a very schematic illustration of a discharge or ejector station.

FIG. 2 is a schematic illustration of the discharge or ejector station 10. This station essentially comprises an ejector 14, which can pivot, for example, and which is activated by the control device 8, for example electromechanically by means of an electromagnet 15 and which effects the ejection of the incorrectly oriented screw caps 2a as well as a lateral opening of the conveyor channel 6.

Figure 3:
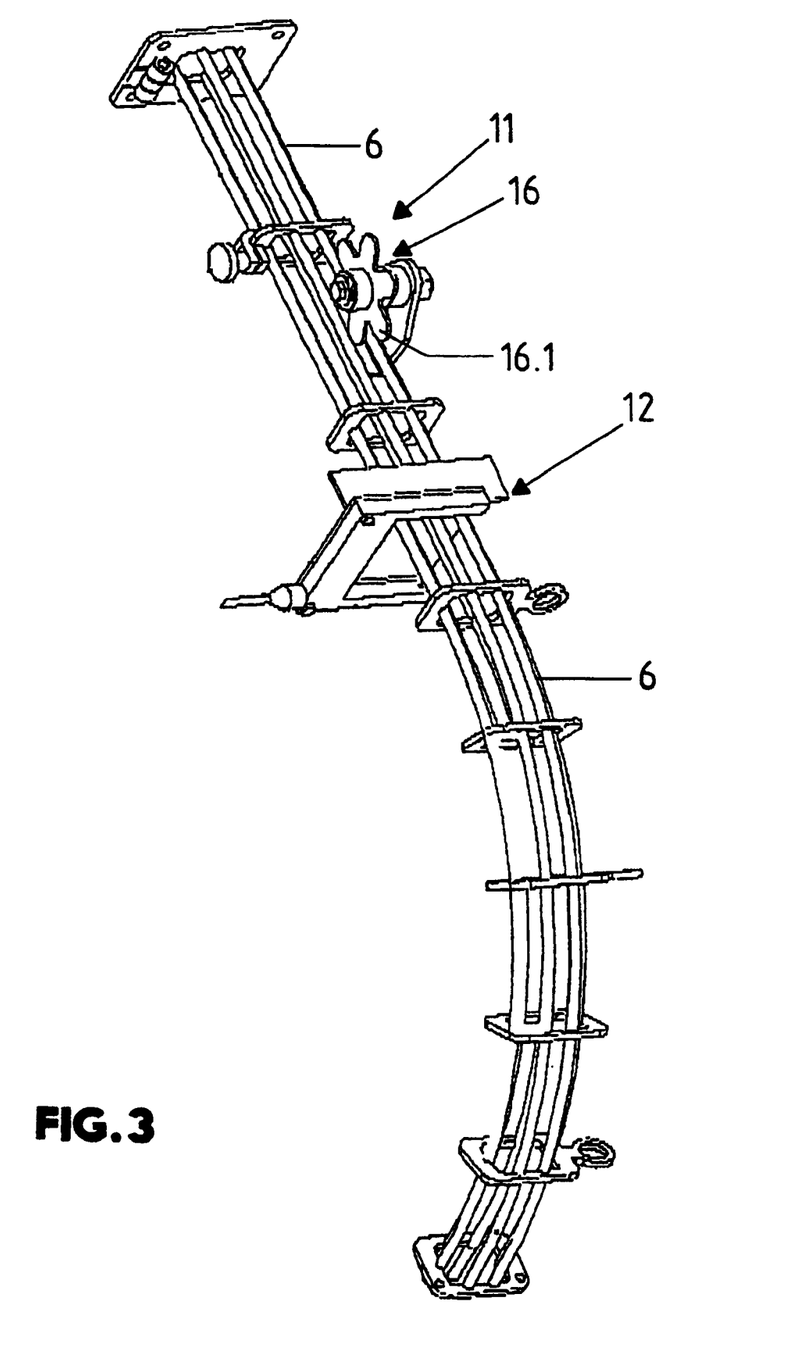
FIG. 3 shows a portion of the feed channel, together with a blocking device formed by a star wheel.

FIG. 3 is a perspective view of a portion of the length of the conveyor channel that is downstream in the direction of transport A of the discharge or ejector station 10 in the vicinity of the blocking device 11a and of the sensor 12 that is downstream of this blocking device in the direction of transport A. In this embodiment the blocking device 11 is realized in the form of a star wheel 16 which can rotate freely on the conveyor channel which is realized in the form of a grid, and which extends with a portion of its circumference into the interior of the conveyor channel 6 such that the projections 16.1 of the star wheel 16, as the correctly oriented screw caps 2 pass, are engaged in the manner of a gear wheel in the open side 2.1 of the screw caps 2 which are lined up close behind one another as the star wheel 16 rotates, while such an engagement is not possible with an incorrectly oriented screw cap 2a, as a result of which the conveyor channel 6 is blocked for such a cap and the screw caps 2 that are behind it in the direction of transport. In the illustrated possible embodiment, the two sensors 12 and 13 are each realized in the form of photoelectric barriers.

The functioning of the cap feed system or apparatus 1 has already been described above, i.e. as long as correctly oriented screw caps 2 get into the conveyor channel 6, they are transported to the output 6.1 of the conveyor channel 6.

Each incorrectly oriented cap 2a is detected by the sensor 7 and then, under the control of the control device 8, it is discharged or ejected as a result of the activation of the discharge or ejector station 10. Before the discharge or ejection, for example, the flow of screw caps 2 in the direction of transport A is blocked by the blocking device behind the incorrectly oriented screw cap 2a that is to be ejected. After the discharge or ejection of the incorrectly oriented cap 2a, the blocking device 9 is immediately or quickly reopened so that the screw caps 2 are then again transported continuously to the capping machine.

Incorrectly oriented screw caps 2a that are not ejected are in any case held back at the blocking device 11 and are removed manually. The continuous flow of the screw caps 2 is monitored by the sensor 12. If this flow is interrupted, the signal from the sensor 12 produces an error signal which triggers and optical and/or acoustical alarm as well as optionally a shutdown of the capping machine.

The internal cross section of the conveyor channel 6 is intentionally designed so that it fits the screw caps 2 in the correct orientation as well as for the screw caps 2a in the incorrect orientation, so that the screw caps 2a can be discharged or ejected from the conveyor channel 6 without clogging it up, or can be removed at the blocking device 11.

Figure 4:
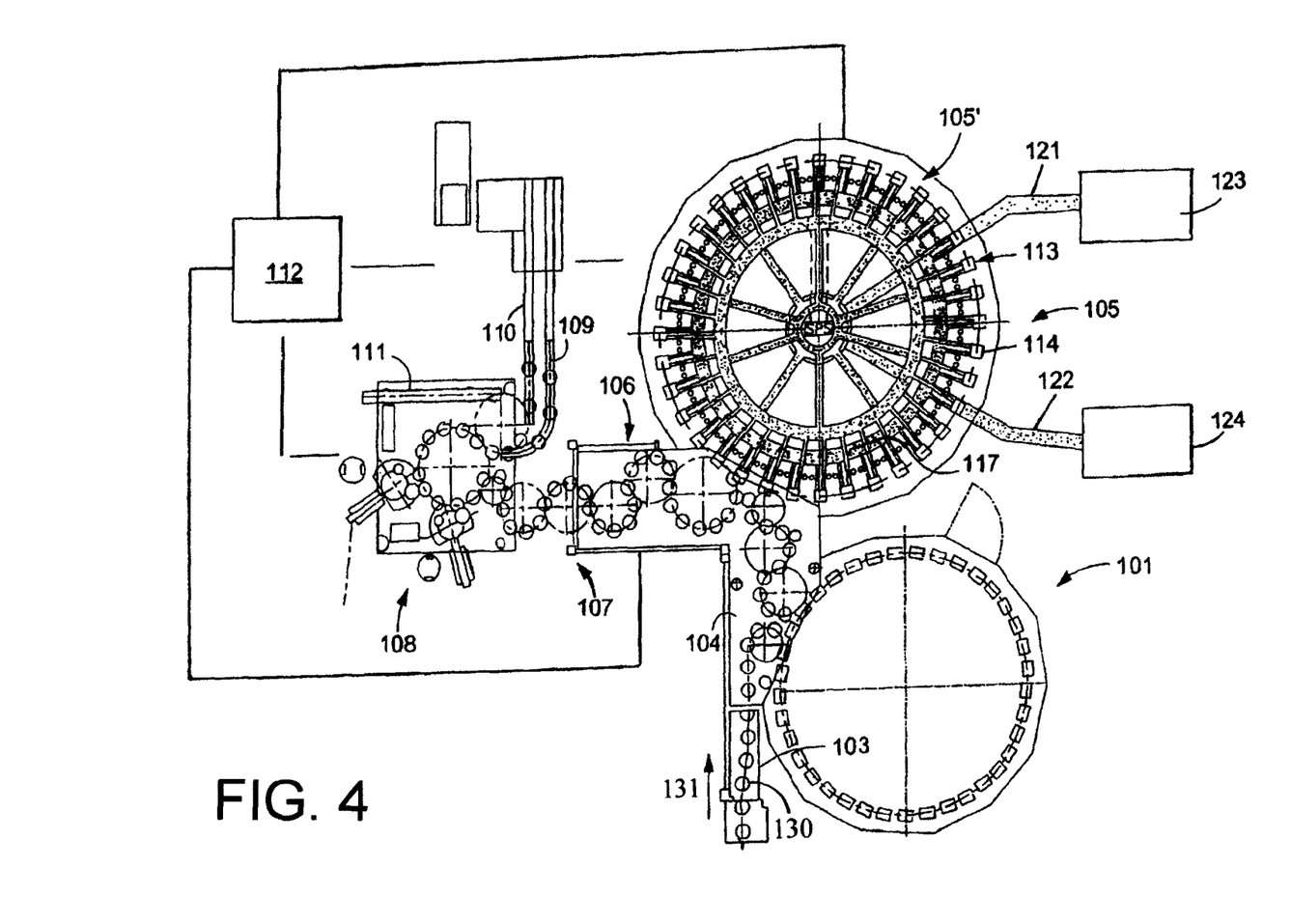
FIG. 4 shows schematically the main components of one possible embodiment example of a system for filling containers, specifically, a beverage bottling plant for filling bottles with at least one liquid beverage, in accordance with at least one possible embodiment, in which system or plant could possibly be utilized at least one aspect, or several aspects, of the embodiments disclosed herein.

FIG. 4 shows schematically the main components of one possible embodiment example of a system for filling containers, specifically, a beverage bottling plant for filling bottles with at least one liquid beverage, in accordance with at least one possible embodiment, in which system or plant could possibly be utilized at least one aspect, or several aspects, of the embodiments disclosed herein.

FIG. 4 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 4, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyer arrangement may be formed, for example, by a plurality of starwheels, or may also include a linear conveyor device.

In at least one possible embodiment of the present application, the beverage bottle closing arrangement or closing station 106 comprises the cap feeder of the present application.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

Figure 5:
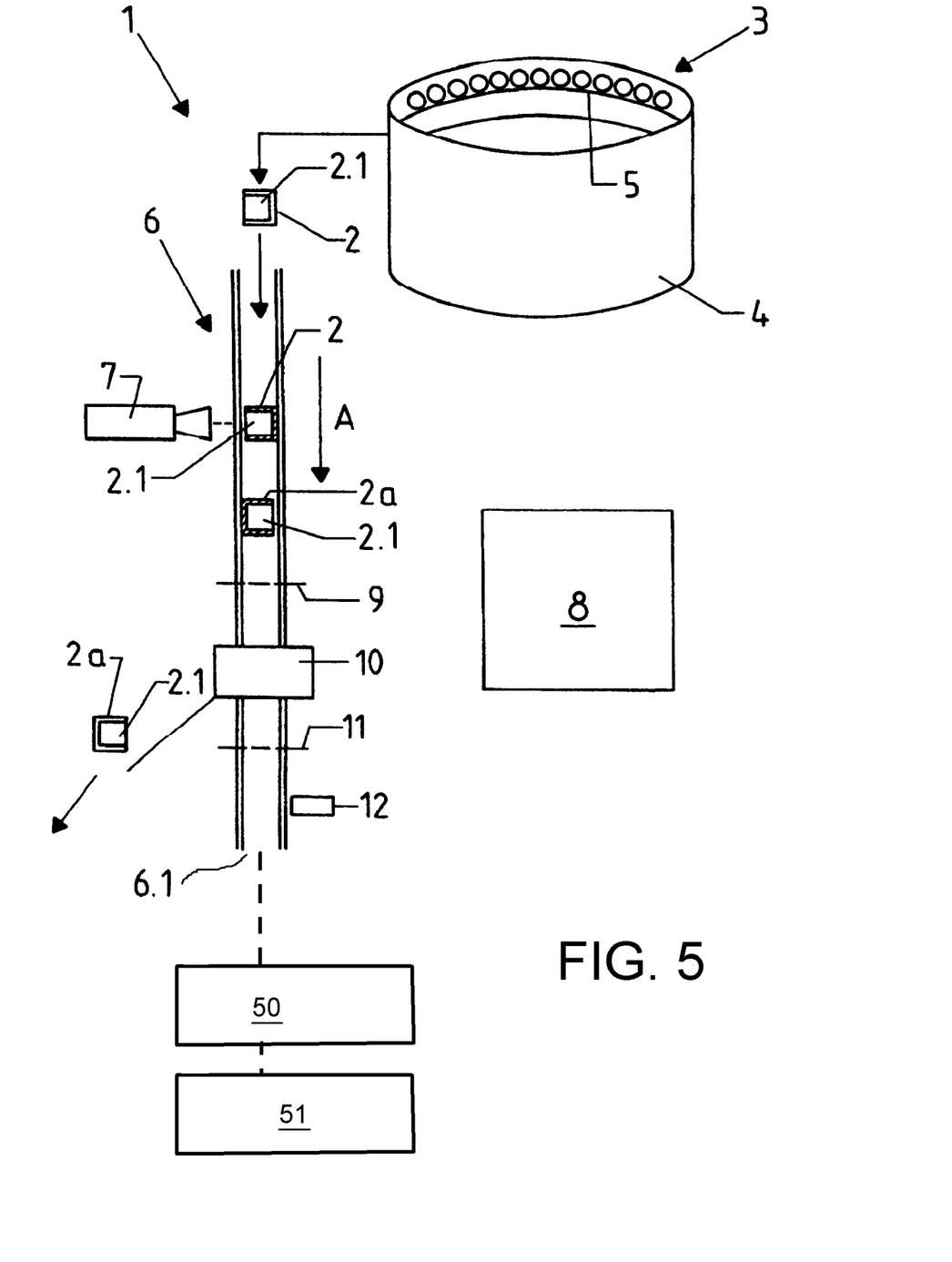
FIG. 5 shows the device of the present application in use with a cap treatment machine and a capping machine.

FIG. 5 shows another embodiment of the cap feeder 1 of the present application, in combination with a closure treatment machine 50 and a capping machine 51. The correctly oriented caps 2, after moving through the conveyor channel 6, are transferred to a treatment machine 50. The treatment machine 50 is configure to clean and/or treat and/or sterilize the correctly oriented cap-type closures 2. Once the caps 2 are sufficiently treated in the treatment machine 50, the treated caps 2 are then transferred to a capping machine 51. The capping machine 51 is configured to place the caps 2 on filled beverage bottles or filled containers and sufficiently seal the bottles as desired.

The present application was described above on the basis of one possible embodiment. It goes without saying that numerous modifications and variations can be made without thereby going beyond the teaching of the present application.

For example, it is possible in one possible embodiment to realize the discharge or ejector station 10 other than in the manner described above, for example so that incorrectly oriented screw caps 2a are removed from the conveyor channel 6 by a blast of air or transported in a helical direction which can be formed by a reversing device, for example, so that the initially incorrectly oriented screw caps 2a are in the correct orientation after they pass through the reversing device, and are delivered to the capping machine, for example via a buffer, together with the screw caps 2 that were correctly oriented from the outset.

Apparatus for the feeding of cap-type closures, in one possible embodiment screw caps, to a capping machine, with at least one conveyor channel which has a cross section that matches the shape of the caps so that the caps are oriented in this conveyor channel with their cap axis perpendicular or virtually perpendicular to the direction of transport in an orientation imposed by the cross section of the conveyor channel, and by means for the discharge or ejection from the conveyor channel of caps that are not in the necessary or desired orientation for their further processing.

One feature or aspect of an embodiment is believed at the time of the filing of this patent application to possibly reside broadly in an apparatus for the feeding of cap-type closures, in one possible embodiment screw caps 2, 2a to a capping machine, with at least one conveyor channel 6 which has a cross section that matches the shape of the caps 2 so that the caps are oriented in this conveyor channel with their cap axis VA perpendicular or virtually perpendicular to the direction of transport A in an orientation imposed by the cross section of the conveyor channel 6, and by means for the discharge or ejection from the conveyor channel 6 of caps that are not in the necessary or desired orientation for their further processing, wherein on the conveyor channel 6 there is at least one sensor 7 which detects the orientation of the caps 2, 2a and downstream of said sensor in the direction of transport A there is a discharge or ejector station 10 which is activated by an electronic control device 8 as a function of the sensor signal from the at least one sensor 7 for a discharge or ejection of an incorrectly oriented cap 2a.

Another feature or aspect of an embodiment is believed at the time of the filing of this patent application to possibly reside broadly in the apparatus, wherein the sensor 7 is realized so that it detects the presence of an open side 2.1 and/or a closed side of the cap-type closures 2, 2a.

Yet another feature or aspect of an embodiment is believed at the time of the filing of this patent application to possibly reside broadly in the apparatus, wherein the sensor 7 is a mechanical sensor.

Still another feature or aspect of an embodiment is believed at the time of the filing of this patent application to possibly reside broadly in the apparatus, wherein the sensor 7 is an electrical sensor, e.g. an opto-electrical sensor, e.g. in the form of a photoelectric barrier, an infrared distance meter and/or of an image processing system that has at least one camera.

A further feature or aspect of an embodiment is believed at the time of the filing of this patent application to possibly reside broadly in the apparatus, wherein downstream of the at least one sensor 7 and upstream of the discharge or ejector station 10 there is a blocking device 9 to block the conveyor channel 6.

Another feature or aspect of an embodiment is believed at the time of the filing of this patent application to possibly reside broadly in the apparatus, wherein the first blocking device 9 can be controlled by the control device 8 to open and close the conveyor channel 6.

Yet another feature or aspect of an embodiment is believed at the time of the filing of this patent application to possibly reside broadly in the apparatus, wherein the first blocking device 9 can be controlled by the control device 8 so that it blocks the conveyor channel 6 when an incorrectly oriented cap 2a is being discharged or ejected.

Still another feature or aspect of an embodiment is believed at the time of the filing of this patent application to possibly reside broadly in the apparatus, wherein downstream of the discharge or ejector station 10 in the direction of transport A of the conveyor channel 6, a blocking device 11 is provided which allows the correctly oriented caps 2 to pass and blocks the conveyor channel 6 for incorrectly oriented caps 2a.

A further feature or aspect of an embodiment is believed at the time of the filing of this patent application to possibly reside broadly in the apparatus, comprising at least one auxiliary sensor 12 downstream of the blocking device 11 in the direction of transport A to detect an interruption of the flow of caps 2.

One feature or aspect of an embodiment is believed at the time of the filing of this patent application to possibly reside broadly in the apparatus, wherein at least one discharge or ejector element that can be actuated by the control device 8 is provided on the discharge or ejector station 10.

Another feature or aspect of an embodiment is believed at the time of the filing of this patent application to possibly reside broadly in the apparatus, wherein the discharge or ejector station 10 has an ejector or diverter 14 which can be actuated by an electrically controllable drive element, for example by an electro-mechanical drive element 15 by means of the control device 8.

Yet another feature or aspect of an embodiment is believed at the time of the filing of this patent application to possibly reside broadly in the apparatus, wherein on the discharge or ejector station 10 there is at least one nozzle for the controlled discharge of a vapor and/or gas medium under pressure, for example for a controlled discharge of compressed air to blow out incorrectly oriented caps 2a.

Still another feature or aspect of an embodiment is believed at the time of the filing of this patent application to possibly reside broadly in the apparatus, wherein the blocking device 11 downstream of the discharge or ejector station 10 is formed by a star wheel 6 which projects into the conveyor channel 6.

A further feature or aspect of an embodiment is believed at the time of the filing of this patent application to possibly reside broadly in the apparatus, wherein the conveyor channel is connected with an inlet to the outlet of a sorting unit 3 by means of which the caps 2, 2a are fed to the conveyor channel 6 from an unorganized supply.

Another feature or aspect of an embodiment is believed at the time of the filing of this patent application to possibly reside broadly in an apparatus for the feeding of cap-type closures, in one possible embodiment screw caps 2, 2a to a capping machine, with at least one conveyor channel 6 which has a cross section that matches the shape of the caps 2 so that the caps are oriented in this conveyor channel with their cap axis VA perpendicular or virtually perpendicular to the direction of transport A in an orientation imposed by the cross section of the conveyor channel 6, and at least one sensor 7 and means for the discharge or ejection from the conveyor channel 6 of caps that are not in the necessary or desired orientation for their further processing, whereby the sensor 7 is realized so that with it the presence of an open side 2.1 and/or a closed side of the cap-type closures 2, 2a is detected, wherein, on the conveyor channel 6 there is at least one sensor 7 which directly detects the orientation of the closures 2, 2a, and downstream of said sensor in the direction of transport A there is a discharge or ejector station 10 which is activated by an electronic control device 8 as a function of the sensor signal from the at least one sensor 7 for a discharge or ejection of an incorrectly oriented cap 2a, whereby the sensor 7 is an electrical sensor, e.g. an opto-electrical sensor, e.g. in the form of a photoelectric barrier, an infrared distance meter and/or of an image processing system that has at least one camera.

One feature or aspect of an embodiment is believed at the time of the filing of this patent application to possibly reside broadly in a capping machine in a beverage bottling plant configured to cap beverage bottles with beverage bottle crown caps or beverage bottle screw caps, said capping machine comprising: a sorting unit being configured and disposed to orient the open sides of beverage bottle crown caps or beverage bottle screw caps with a predetermined orientation for the capping of beverage bottles; a conveyor channel comprising a conveyor channel output; said conveyor channel being configured and disposed to permit movement of beverage bottle crown caps or beverage bottle screw caps from said sorting unit to said conveyor channel output; said conveyor channel being configured to move beverage bottle crown caps or beverage bottle screw caps on their rounded exterior side surfaces; a sensor being disposed adjacent to at least a portion of said conveyor channel and being configured and disposed to detect the orientation of beverage bottle crown caps or beverage bottle screw caps, upon beverage bottle crown caps or beverage bottle screw caps moving down said conveyor channel and passing said sensor; an ejector station being disposed on said conveyor channel downstream of said sensor and being configured and disposed to eject beverage bottle crown caps or beverage bottle screw caps not in the predetermined orientation, upon said sensor detecting an beverage bottle crown cap or beverage bottle screw cap not in the predetermined orientation passing by said sensor; and a control unit being configured and disposed to receive signals from said sensor relating to the orientation of beverage bottle crown caps or beverage bottle screw caps and being further configured and disposed to send signals to said ejector station to eject beverage bottle crown caps or beverage bottle screw caps not in the predetermined orientation, upon said sensor detecting an beverage bottle crown cap or beverage bottle screw cap not in the predetermined orientation.

Another feature or aspect of an embodiment is believed at the time of the filing of this patent application to possibly reside broadly in the capping machine, wherein said capping machine comprises a first blocking device: disposed downstream of said sensor in a direction of transport; disposed upstream of said ejector station in a direction of transport; and configured to block said conveyor channel.

Yet another feature or aspect of an embodiment is believed at the time of the filing of this patent application to possibly reside broadly in the capping machine, wherein: said first blocking device is configured to be controlled by said control unit; and said first blocking device is further configured to open and close said conveyor channel.

Still another feature or aspect of an embodiment is believed at the time of the filing of this patent application to possibly reside broadly in the capping machine, wherein said first blocking device is further configured to block said conveyor channel upon a beverage bottle crown cap or beverage bottle screw cap not in the predetermined orientation being ejected.

A further feature or aspect of an embodiment is believed at the time of the filing of this patent application to possibly reside broadly in the capping machine, wherein said capping machine further comprises a second blocking device: disposed on said conveyor channel; disposed downstream of said ejector station in a direction of transport; being configured to permit beverage bottle crown caps or beverage bottle screw caps in the predetermined orientation to pass through said conveyor channel; and being configured to restrict beverage bottle crown caps or beverage bottle screw caps not in the predetermined orientation from passing through said conveyor channel.

Another feature or aspect of an embodiment is believed at the time of the filing of this patent application to possibly reside broadly in the capping machine, wherein said capping machine further comprises at least one additional sensor: disposed downstream of said second blocking device in a direction of transport; and configured to detect an interruption of the movement of beverage bottle crown caps or beverage bottle screw caps.

Yet another feature or aspect of an embodiment is believed at the time of the filing of this patent application to possibly reside broadly in the capping machine, wherein: said ejector station comprises at least one discharge or ejector element; and said at least one discharge or ejector element is configured to be actuated by said control unit.

Still another feature or aspect of an embodiment is believed at the time of the filing of this patent application to possibly reside broadly in the capping machine, wherein: said capping machine further comprises an electrically controllable drive element configured to be actuated by said control unit; said ejector arrangement further comprises an ejector or diverter configured to be actuated by said electrically controllable drive element; and said electrically controllable drive element further comprises an electro-mechanical drive element configured to be actuated by said control unit.

A further feature or aspect of an embodiment is believed at the time of the filing of this patent application to possibly reside broadly in the capping machine, wherein said ejector station further comprises at least one nozzle configured to permit a discharge of a vapor and/or gas medium under pressure to blow out beverage bottle crown caps or beverage bottle screw caps not in the predetermined orientation; said ejector station is further configured to permit a controlled discharge of compressed air; said second blocking device comprises a star wheel configured to project into said conveyor channel; said sorting unit comprises an outlet; said conveyor channel comprises an inlet configured to connect to said outlet of said sorting unit; and said sorting unit is configured to accept beverage bottle crown caps or beverage bottle screw caps from an unorganized supply.

One feature or aspect of an embodiment is believed at the time of the filing of this patent application to possibly reside broadly in a capping machine in a configured to cap containers with container caps, said capping machine comprising: a sorting unit being configured and disposed to orient the open sides of containers caps with a predetermined orientation for the capping of containers; a conveyor channel comprising a conveyor channel output; said conveyor channel being configured and disposed to permit movement of container caps from said sorting unit to said conveyor channel output; said conveyor channel being configured to move container caps on their rounded exterior side surfaces; a sensing arrangement being configured and disposed to detect the orientation of containers caps, upon container caps moving down said conveyor channel and passing said sensing arrangement; and an ejector arrangement being configured and disposed to eject container caps not in the predetermined orientation, upon said sensing arrangement detecting a container cap not in the predetermined orientation passing by said sensing arrangement.

Another feature or aspect of an embodiment is believed at the time of the filing of this patent application to possibly reside broadly in the capping machine, wherein said capping machine comprises a first blocking device: disposed downstream of said sensing arrangement in a direction of transport; disposed upstream of said ejector arrangement in a direction of transport; and configured to block said conveyor channel.

Yet another feature or aspect of an embodiment is believed at the time of the filing of this patent application to possibly reside broadly in the capping machine, wherein: said capping machine comprises a control unit configured and disposed: to receive signals from said sensor relating to the orientation of container caps; and to send signals to said ejector arrangement to eject container caps not in the predetermined orientation, upon said sensing arrangement detecting a container cap not in the predetermined orientation; said first blocking device is configured to be controlled by said control unit; and said first blocking device is further configured to open and close said conveyor channel.

Still another feature or aspect of an embodiment is believed at the time of the filing of this patent application to possibly reside broadly in the capping machine, wherein said first blocking device is further configured to block said conveyor channel upon a container cap not in the predetermined orientation being ejected.

A further feature or aspect of an embodiment is believed at the time of the filing of this patent application to possibly reside broadly in the capping machine, wherein said capping machine further comprises a second blocking device: disposed on said conveyor channel; disposed downstream of said ejector arrangement in a direction of transport; being configured to permit caps in the predetermined orientation to pass through said conveyor channel; and being configured to restrict caps not in the predetermined orientation from passing through said conveyor channel.

Another feature or aspect of an embodiment is believed at the time of the filing of this patent application to possibly reside broadly in the capping machine, wherein said capping machine further comprises at least one additional sensing arrangement: disposed downstream of said second blocking device in a direction of transport; and configured to detect an interruption of the movement of container caps.

Yet another feature or aspect of an embodiment is believed at the time of the filing of this patent application to possibly reside broadly in the capping machine, wherein: said ejector arrangement comprises at least one discharge or ejector element; said at least one discharge or ejector element is configured to be actuated by said control unit.

Still another feature or aspect of an embodiment is believed at the time of the filing of this patent application to possibly reside broadly in the capping machine, wherein: said capping machine further comprises an electrically controllable drive element configured to be actuated by said control unit; said ejector arrangement further comprises an ejector or diverter configured to be actuated by said electrically controllable drive element; and said electrically controllable drive element further comprises an electro-mechanical drive element configured to be actuated by said control unit.

A further feature or aspect of an embodiment is believed at the time of the filing of this patent application to possibly reside broadly in the capping machine, wherein said ejector arrangement further comprises at least one nozzle configured to permit a discharge of a vapor and/or gas medium under pressure to blow out container caps not in the predetermined orientation; and said ejector arrangement is further configured to permit a controlled discharge of compressed air.

Another feature or aspect of an embodiment is believed at the time of the filing of this patent application to possibly reside broadly in the capping machine, wherein said second blocking device comprises a star wheel configured to project into said conveyor channel.

Yet another feature or aspect of an embodiment is believed at the time of the filing of this patent application to possibly reside broadly in the capping machine, wherein: said sorting unit comprises an outlet; said conveyor channel comprises an inlet configured to connect to said outlet of said sorting unit; and said sorting unit is configured to accept container caps from an unorganized supply.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of methods and apparatuses for closing bottles and containers and their components that may possibly be utilized or possibly adapted for use in at least one possible embodiment of the present application may possibly be found in the following U.S. Pat. No. 5,398,485 issued to Osifchin on Mar. 21, 1995; U.S. Pat. No. 5,402,623 issued to Ahlers on Apr. 4, 1995; U.S. Pat. No. 5,419,094 issued to Vander Bush, Jr. et al. on May 30, 1995; U.S. Pat. No. 5,425,402 issued to Pringle on Jun. 20, 1995; U.S. Pat. No. 5,447,246 issued to Finke on Sep. 5, 1995; U.S. Pat. No. 5,449,080 issued to Finke on Sep. 12, 1995; U.S. Pat. No. 4,389,833, having the title "bottle closing machine having bottle neck washing arrangement;" U.S. Pat. No. 4,205,502, having the title "rotary bottle closing machine;" U.S. Pat. No. 6,484,477, having the title "capping machine for capping and closing containers, and a method for closing containers;" U.S. Pat. No. 6,430,896, having the title "capping machine;" U.S. Pat. No. 5,918,442, having the title "in-line capping machine;" U.S. Pat. No. 5,400,564, having the title "capping machine;" U.S. Pat. No. 5,669,209, having the title "in-line capping machine;" U.S. Pat. No. 7,360,345, having the title "beverage bottle cap treatment device," published on Apr. 22, 2008; and U.S. Pat. No. 7,089,715, having the title "beverage bottling plant and method for filling bottles including a treatment device for beverage container caps," published on Aug. 15, 2006.

Some examples of closing machines with the rotating sorting drums or units and/or device is that the transfer caps from sorting units to chutes or channels which may possibly be utilized or adapted for use in at least one possible embodiment of the present application may possibly be found in the following U.S. patents: U.S. Pat. No. 7,353,643, having the title "SYSTEM FOR FEEDING CAPS WITH ROTATING-DRUM ACCUMULATION DEVICE," published on Apr. 8, 2008; U.S. Pat. No. 6,105,343, having the title "APPARATUS AND METHOD FOR A CAPPING MACHINE," published on Aug. 22, 2000; U.S. Pat. No. 5,309,694, having the title "DEVICE FOR USE WITH A CLOSURE MAGAZINE FOR INTRODUCING CLOSURES INTO A CLOSURE CHANNEL," published on May 10, 1994; and U.S. Pat. No. 4,558,802, having the title "CAROUSEL TYPE DISPENSER," published on Dec. 17, 1985.

All of the patents, patent applications or patent publications, which were cited in the International Search Report dated, and/or cited elsewhere are hereby incorporated by reference as if set forth in their entirety herein as follows: EP 0 782 888, having the title "Device for automatically removing wrongly oriented elements from a supply line of caps, plugs or generally concave elements," published Jul. 9, 1997; DE 103 07 601, having the following German title "VERTIKALE PARALLELFÖRDERUNG VON DECKELVERSCHLÜSSEN," published on Dec. 11, 2003; U.S. Pat. No. 6,062,395, having the title "REVERSED CONTAINER END EJECTION SYSTEM," published May, 16, 2000; and U.S. Pat. No. 3,879,921, having the title, "OVERCAP SEATER FOR AEROSOL CONTAINERS," published Apr. 29, 1975.

The patents, patent applications, and patent publication listed above in the immediately preceding three paragraphs, beginning with the phrase "Some examples of methods and apparatuses for closing bottles and containers . . . " and ending with the phrase " . . . published Apr. 29, 1975," are herein incorporated by reference as if set forth in their entirety. The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 039 091.1, filed on Aug. 19, 2006, having inventors Lothar WILHELM and Heinz HILLMANN, and DE-OS 10 2006 039 091.1 and DE-PS 10 2006 039 091.1, and International Application No. PCT/EP2007/

007206, filed on Aug. 16, 2007, having WIPO Publication No. WO 2008/022735 and inventors Lothar WILHELM and Heinz HILLMANN, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/007206 and German Patent Application 10 2006 039 091.1 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/007206 and DE 10 2006 039 091.1 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Cap feeder
2 Screw cap
2.1 Open side of the caps
2a Incorrectly oriented screw cap
3 Sorting unit
4 Vibrating bowl-type feeder
5 Conveyor line
6 Conveyor channel
7 Sensor
8 Electronic control device, e.g. computer
9 Blocking device
10 Ejector station
11 Blocking device
12 Sensor
13 Sensor
14 Ejector
15 Magnet
16 Star wheel
16.1 Projection or tooth of the star wheel 16
A Direction of the screw caps 2 or 2a in the conveyor channel 6
VA Cap axis

What is claimed is:

1. A capping machine being configured to cap containers with container caps, said capping machine comprising:
    a sorting unit being configured and disposed to orient container caps on their cylindrical exterior side surface;
    a conveyor channel being configured to receive container caps from said sorting unit;
    said conveyor channel being disposed to extend downwardly from said sorting unit in a vertical direction to permit container caps to move therethrough by gravity;

said conveyor channel having a cross-section matched to the shape of the container caps to guide container caps with the cylindrical exterior side surface of the container caps essentially perpendicular to the direction of movement of the container caps;

a sensing arrangement being disposed adjacent said conveyor channel to sense container caps while the container caps are falling past said sensing arrangement;

said sensing arrangement being configured to detect, while the container caps are falling past said sensing arrangement, if the container caps are in a predetermined orientation appropriate to permit placement of the container caps on a container;

an ejector arrangement being disposed downstream of said sensing arrangement and being configured, upon said sensing arrangement detecting a falling container cap not in the predetermined orientation, to eject the container cap out of the conveyor channel; and a first blocking device being disposed downstream of said sensing arrangement and upstream of said ejector arrangement, and being configured to temporarily block said conveyor channel to prevent movement of container caps therethrough.

2. The capping machine according to claim 1, wherein:
said capping machine comprises a control unit configured and disposed:
   to receive signals from said sensor relating to the orientation of container caps; and
   to send signals to said ejector arrangement to eject container caps not in the predetermined orientation, upon said sensing arrangement detecting a container cap not in the predetermined orientation;
said first blocking device is configured to be controlled by said control unit; and
said first blocking device is further configured to open and close said conveyor channel.

3. The capping machine according to claim 2, wherein said first blocking device is further configured, upon a container cap not in the predetermined orientation being ejected by said ejector arrangement, to block said conveyor channel to prevent additional, subsequent container caps from moving into said ejector arrangement.

4. The capping machine according to claim 3, wherein said capping machine further comprises a second blocking device:
   disposed on said conveyor channel;
   disposed downstream of said ejector arrangement in a direction of transport;
   being configured to permit caps in the predetermined orientation to pass through said conveyor channel; and
   being configured to restrict caps not in the predetermined orientation from passing through said conveyor channel.

5. The capping machine according to claim 4, wherein said capping machine further comprises at least one additional sensing arrangement:
   disposed downstream of said second blocking device in a direction of transport; and
   configured to detect an interruption of the movement of container caps.

6. The capping machine according to claim 5, wherein:
said ejector arrangement comprises at least one discharge or ejector element;
said at least one discharge or ejector element is configured to be actuated by said control unit.

7. The capping machine according to claim 6, wherein:
said capping machine further comprises an electrically controllable drive element configured to be actuated by said control unit;
said ejector arrangement further comprises an ejector or diverter configured to be actuated by said electrically controllable drive element; and
said electrically controllable drive element further comprises an electro-mechanical drive element configured to be actuated by said control unit.

8. The capping machine according to claim 7, wherein said ejector arrangement further comprises at least one nozzle configured to permit a discharge of a vapor and/or gas medium under pressure to blow out container caps not in the predetermined orientation; and
   said ejector arrangement is further configured to permit a controlled discharge of compressed air.

9. The capping machine according to claim 8, wherein said second blocking device comprises a star wheel configured to project into said conveyor channel.

10. The capping machine according to claim 9, wherein:
said sorting unit comprises an outlet;
said conveyor channel comprises an inlet configured to connect to said outlet of said sorting unit; and
said sorting unit is configured to accept container caps from an unorganized supply.

11. The capping machine according to claim 1, wherein said ejector arrangement comprises a pivotable portion of said conveyor channel configured to be pivoted to divert and eject an incorrectly-oriented container cap out of said conveyor channel.

* * * * *